(12) United States Patent
Dishongh et al.

(10) Patent No.: US 7,979,079 B2
(45) Date of Patent: Jul. 12, 2011

(54) SINGLE POINT LOCATION TRACKING FOR A MOBILE DEVICE IN A COMMUNICATION NETWORK

(75) Inventors: Terry Dishongh, Portland, OR (US); Kevin Rhodes, Beaverton, OR (US)

(73) Assignee: Intel-GE Care Innovations LLC, Folsom, CA (US)

( * ) Notice: Subject to any disclaimer, the term of this patent is extended or adjusted under 35 U.S.C. 154(b) by 918 days.

(21) Appl. No.: 11/862,879

(22) Filed: Sep. 27, 2007

(65) Prior Publication Data

US 2009/0088087 A1   Apr. 2, 2009

(51) Int. Cl.
*H04W 24/00* (2009.01)

(52) U.S. Cl. ............... 455/456.1; 455/456.5; 455/456.6

(58) Field of Classification Search ............... 455/456.1, 455/456.5, 456.6
See application file for complete search history.

(56) References Cited

U.S. PATENT DOCUMENTS

| | | | |
|---|---|---|---|
| 2005/0181804 A1* | 8/2005 | Misikangas et al. | 455/456.1 |
| 2005/0185618 A1* | 8/2005 | Friday et al. | 370/331 |
| 2005/0266855 A1* | 12/2005 | Zeng et al. | 455/456.1 |

OTHER PUBLICATIONS

P. Bahl V. Padmanabhan, "A Software System for Locating Mobile Users: Design, Evaluation & Lessons," Microsoft Research Technical Report TR-2000-12, Feb. 2000.*

* cited by examiner

*Primary Examiner* — Nghi H Ly
*Assistant Examiner* — Larry Sternbane
(74) *Attorney, Agent, or Firm* — Pillsbury Winthrop Shaw Pittman LLP

(57) ABSTRACT

Briefly, in accordance with one or more embodiments, the location of a mobile device within a floor plan of a building or the like environment may be determined using a single transmission link between transceiver and the mobile device. A bit error rate value and a receiver signal strength indication value are measured for the present location of the mobile device in the floor plan. The coordinates where the mobile device is located may be determined by looking up the measured bit error rate value and the received signal strength indication value in a lookup table. Due to environmental factors of the floor plan, the combination of the bit error rate value and the received signal strength indication value corresponds to a unique coordinate location in the floor plan from which the location of the mobile device may be determined.

20 Claims, 7 Drawing Sheets

SINGLE POINT LOCATION TRACKING FOR A MOBILE DEVICE IN A COMMUNICATION NETWORK

BACKGROUND

In-building location determination is inherently difficult and generally not possible with the Global Positioning System (GPS) because the signals from the GPS orbital satellite signals are too weak to be received through most building construction materials. Shorter-range wireless technology can be used to determine inter-station range using either received signal strength indication (RSSI) or time-of-flight measurements. The former is typically more error prone due to the vagaries of signal reflection and ferrous materials that are capable of propagating a signal, thereby distorting what would otherwise be a relatively straightforward calculation based on an inverse square law. Time-of-flight based on the propagation time of electromagnetic (EM) waves in space may be a more accurate approach than an RSSI approach, however, timing radio signals to a few nanoseconds may be technically challenging.

Indoor location tracking utilizing the RSSI approach typically involves two or more receivers for RSSI location awareness. Using two or more receivers may be, however, an issue because the device that is a master device generally can only have eight slaves in a piconet system, so as a result finding a position for a mobile device means that each stationary device is a slave to a mobile master. If portability is an issue then duty cycle can adversely expend the battery life of the mobile devices. Also other devices may not be able to communicate with the master to save data. An alternative architecture would be to have the mobile device function as a slave in the network. The issue is, however, that the other slaves can not speak to the mobile slave.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
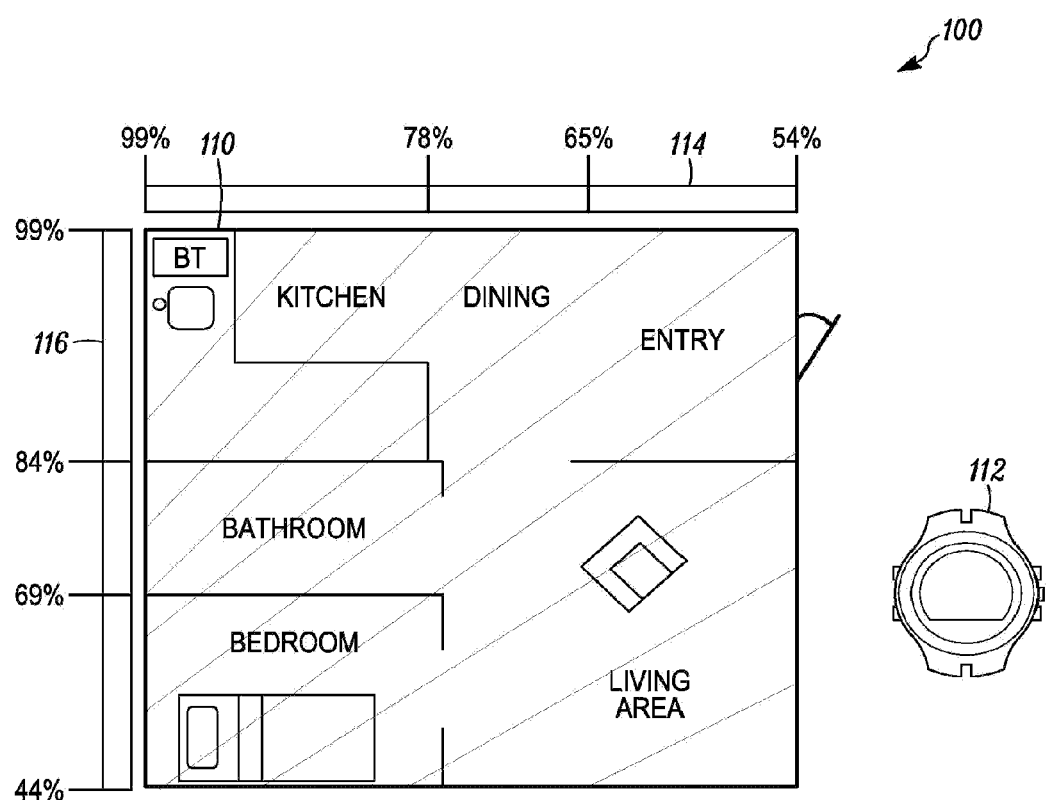
FIG. 1 is a top plan view of a floor plan of a building or similar location showing lines of received signal strength indication (RSSI) for a radio transceiver disposed at a location with respect to the floor plan in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a top plan view of a floor plan of a building or similar location showing lines of received signal strength indication (RSSI) for a radio transceiver disposed at a location with respect to the floor plan in accordance with one or more embodiments will be discussed. In the diagram, the RSSI value is indicated by percentage values along first and second orthogonal axes 114 and 116. A transceiver 110, such as a personal computer or similar device, equipped with a radio-frequency (RF) transceiver is located at or near the intersection of axes 114 and 116, which may be a kitchen area of a house in the example shown in FIG. 1. In one or more embodiments, the RF transceiver of transceiver 110 may comprise a Bluetooth radio compliant with a Bluetooth specification, may be an Ultra Wideband (UWB) transceiver compliant with a UWB specification, may be a wireless local area network (WLAN) transceiver compliant with an IEEE 802.11a/b/g/n specification, and so on. In general, the intensity and/or radio-signal quality is better at locations closer to transceiver 110, and the radio-signal quality diminishes at locations of greater distance away from transceiver 110. In one or more embodiments, mobile device 112 may comprise a watch, personal digital assistant (PDA), smart phone, cell phone, badge, pendant, or similar article able to be worn or carried by a user throughout the house represented in FIG. 1, although the scope of the claimed subject matter is not limited in this respect.

As shown in FIG. 1, diagonal lines cutting across the floor plan represent lines of iso-RSSI that connect identical values on each of the axes 114 and 116. Using a read of the RSSI value for a given location of mobile device 112 may result in an ambiguity of the location of mobile device 112, as the RSSI location reading may indicate the location of mobile device 112 in the bedroom, bathroom or the dining area without the ability to resolve the actual position of mobile device 112. Such a result may be idealized and may not be seen necessarily in most applications of RF technology. In most instances, the actual RSSI profile of the building may be more complex than that shown in FIG. 1 due to reflections, bounces, interference and/or the varying inability of the RF to penetrate objects and other structures. In some cases, a system that does not exhibit interference would yield two or more possible positions for a given RSSI reading from mobile device 112. In accordance with one or more embodiments, a more accurate location reading may be obtained by utilizing two or more pieces of information about the status of the connection between transceiver 110 and mobile device 110. In a home, for example, there are various points at which a radio signal may be bounced, reflected, or at least partially blocked. Such an RF profile may be unique to given home and positions of transceiver 110 and mobile device 112, and/or home construction and furnishings. In a unique environment such as a home, the bit error rate (BER), which may result from the collision of transmitted packets and/or packets which have not been received, may no longer be a function of the radio signal strength.

Figure 2:
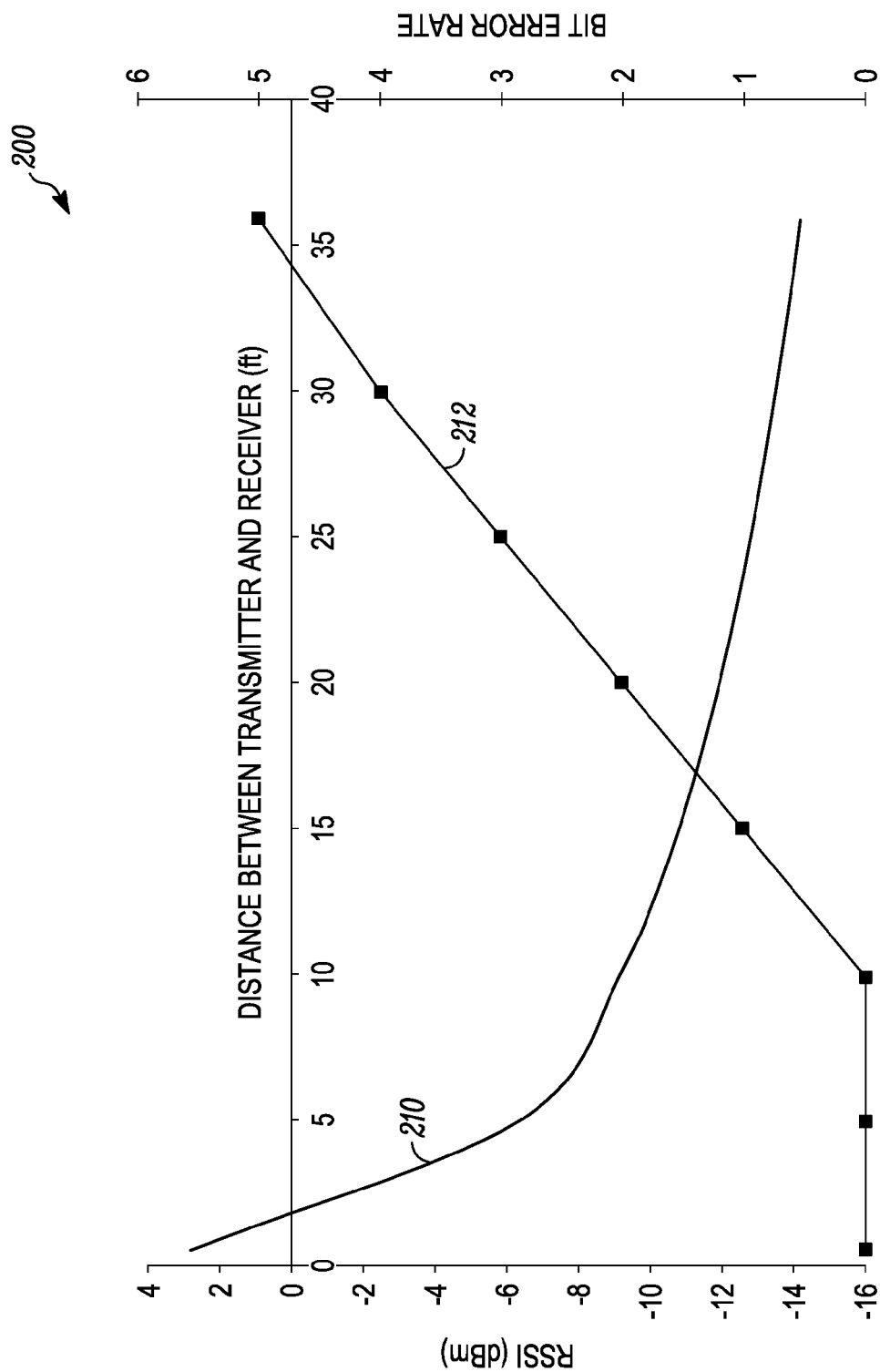
FIG. 2 is a graph of free space RSSI with respect to distance compared with bit error rate (BER) to distance an in accordance with one or more embodiments.

Referring now to FIG. 2, a graph of free space RSSI with respect to distance compared with bit error rate (BER) to distance an in accordance with one or more embodiments will be discussed. In free space or an open field, the RSSI shown at plot 210 decays as the distance between a receiver, for example, mobile device 112, and a transmitter, for example, transceiver 110, grows proportional to an exponential power of four. Thus, in free space the RSSI decays to the fourth power whereas as shown at plot 212, beyond a given distance the bit error rate increases linearly as the distance between the transmitter and the receiver increases. The data shown in graph 200 of FIG. 2 was taken in a field near Amber Glen in Hillsboro, Oreg., USA using a pair of Bluetooth Blueradios SC30A. Using the same two radios when the test was repeated in a home, it was discovered that the BER becomes at least partially less tied to the distance and at least partially more tied to the amount of errors associated with multipath issues and/or interference in the home due to the construction and layout of the home as shown in and described with respect to FIG. 3, below.

Figure 3:
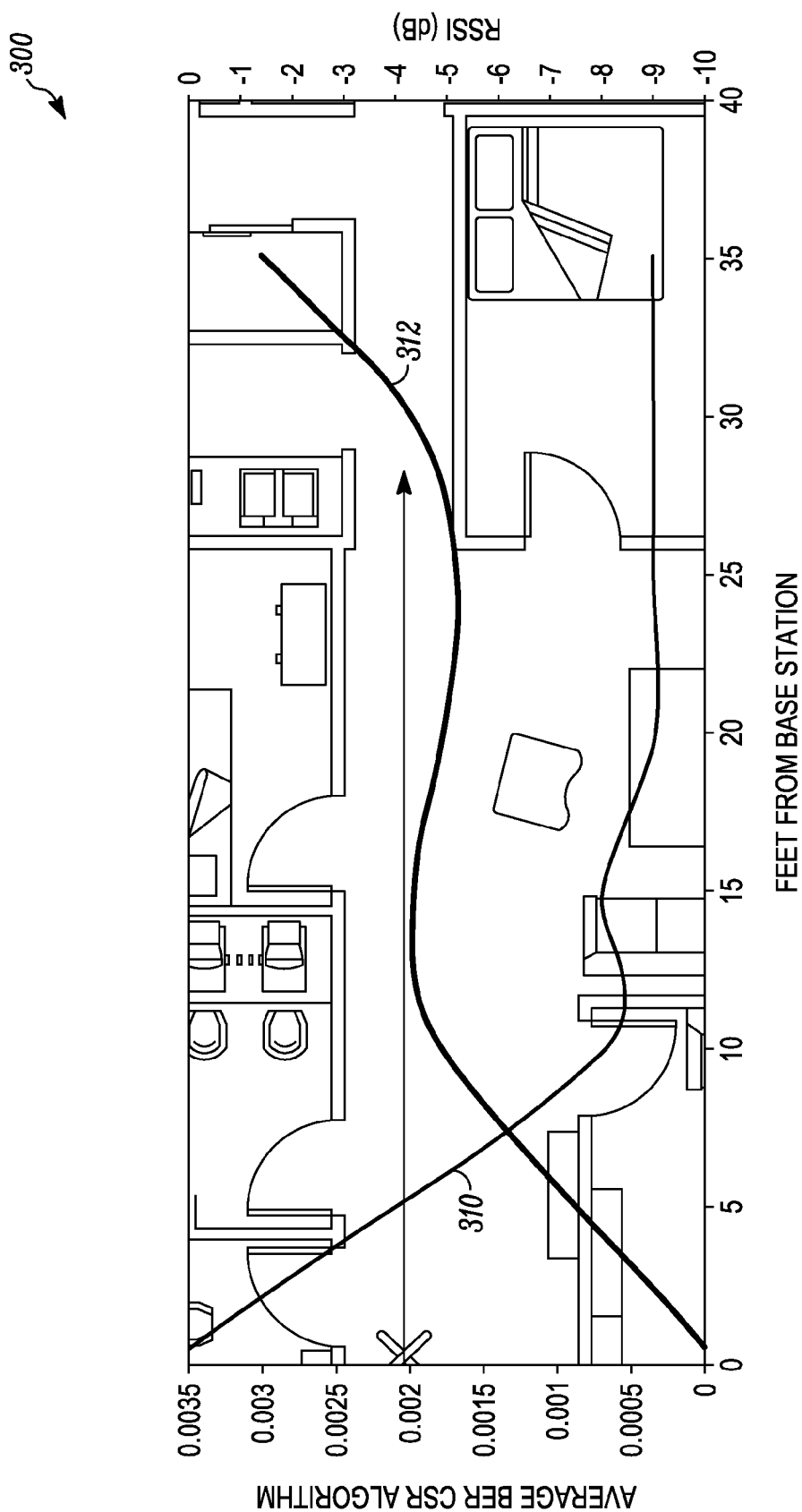
FIG. 3 is a top plan view of a floor plan of a building showing the decoupling of BER from distance due to multipath and interference in accordance with one or more embodiments.

Referring now to FIG. 3, a top plan view of a floor plan of a building showing the decoupling of BER from distance due to multipath and interference in accordance with one or more embodiments will be discussed. As shown in graph 300 FIG. 3, the RSSI as shown at plot 310 falls generally as expected, but the BER as shown at plot 312 exhibits a unique signature due to the wall edge at 12 feet and 22 feet from the base station transceiver 110. As a result, a combination of RSSI and BER data in the home is capable of providing a unique signature of the position of a signal at a single corresponding coordinate point in the floor plan via a measurement of the transmission of an RF signal between a transceiver and a receiver.

Figure 4:
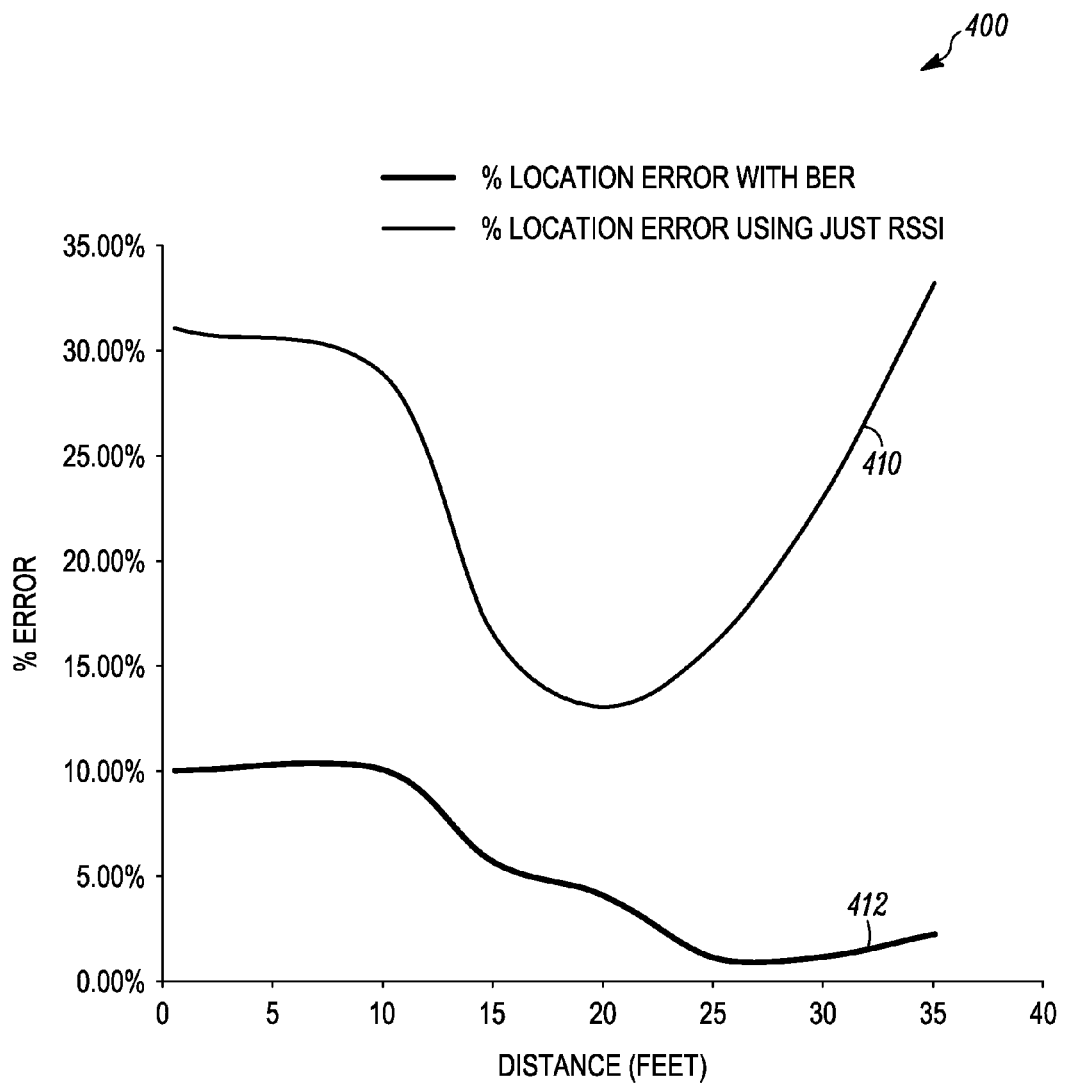
FIG. 4 is a graph of the error rate of a combination of RSSI and BER with respect to distance in accordance with one or more embodiments.

Referring now to FIG. 4, a graph of the error rate of a combination of RSSI and BER with respect to distance in accordance with one or more embodiments will be discussed. The graph 400 shown in FIG. 4 was generated by repeating the experiment shown in and described with respect to FIG. 3 using a watch as mobile device 112 to compare the error rates of locating the watch using just RSSI and using a combination of RSSI and BER. The experiment was performed using the following algorithm to determine the location of the watch in the home:

Transmit a BT Ping (consists of watch ser# and time),
    Wait TBD sec's for reply
        RSSI log message format:
            Time, Avg.RSSI, AVG_BER, Watch Ser#, Sample#
        Continue to send until ACK'ed
        If ACK received turn off BT radio
            Max ACK time 30 sec. - 1 min (TBD)

It should be noted that the algorithm, above, is merely an example algorithm capable of being utilized to obtain data pertaining to a combination of RSSI and BER with respect to distance, however, other algorithms and/or other techniques may also be utilized, and the scope of the claimed subject matter is not limited in this respect.

The error in the two methodologies is shown in graph 400 for the in home test. As the receiver, for example, mobile station 112, trends farther from the transmitter, for example, transceiver 110, percent error for the RSSI only method shown at plot 410 increases as the distance increases, such as at distances beyond 20 feet as shown in the example of FIG. 4. The percent error, however, actually decreases with increasing distance using the combined method of RSSI and BER as shown at plot 412. The percent error of the combined method may increase as well, for example, if an architectural obstacle, such as a wall or partial wall, is disposed in the direct path between the receiver and transmitter. In such a case, the BER may increase due to these structures, thereby increasing the percent error in the location reading. Overall, the location error rate using the combination of RSSI and BER is lower that the location error rate of using just RSSI, and the scope of the claimed subject matter is not limited in this respect.

Figure 5:
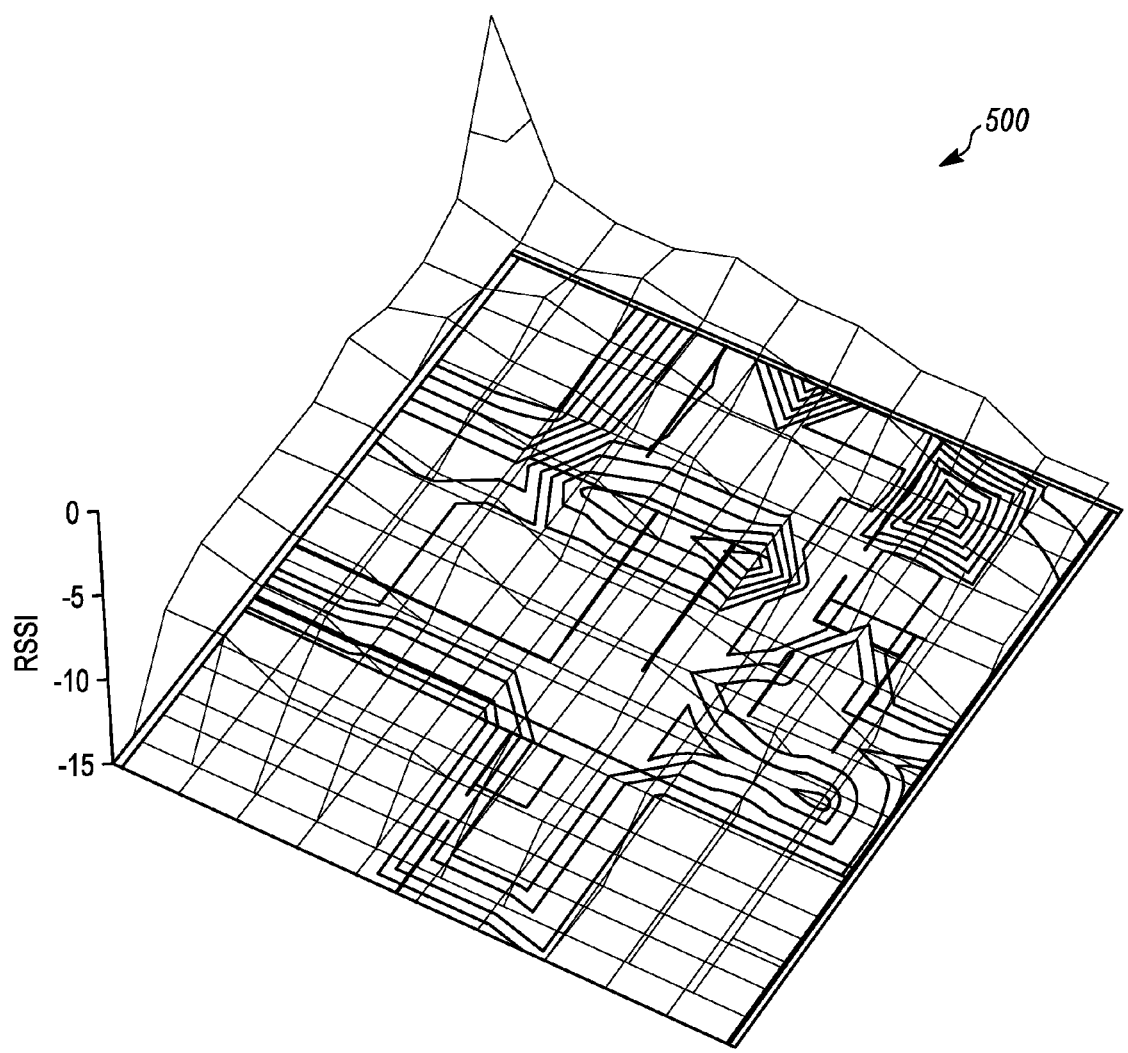
FIG. 5 is a graph of X, Y position in RSSI/BER space for utilization in a single point location tracking in accordance with one or more embodiments.

Referring now to FIG. 5, a graph of X, Y position in RSSI/BER space for utilization in a single point location tracking in accordance with one or more embodiments will be discussed. As shown in graph 500 of FIG. 5, effectively the X and Y position may be mapped into RSSI/BER space for location determination. In one or more embodiments, one or more additional parameters can also be utilized, for example, transmission strength, to obtain a higher confidence and/or lower percent error in the location calculation, although the scope of the claimed subject matter is not limited in this respect. In one or more embodiments, a map of a house or similar location is done first to determine the BER and RSSI averaged in various rooms and in various locations throughout the rooms. A lookup table of the house map may be stored in transceiver 110, which may be used to infer the position of a person in the home or building wearing and/or carrying mobile device 112. Graph 500 shows such an example map of the RSSI and the BER for a home. Such a map may be a three-dimensional (3-D) graph in which the BER is plotted for the given X, Y position on the floor graph 500, and the height values shown with wire-frame in graph 500 is the RSSI at the given X, Y position. By looking up the BER and RSSI values in the lookup table, the X, Y position of mobile device 112 may be determined from the X, Y values stored in the lookup table, and the unique position of mobile device in the house may be determined-via a single location reading of the signal transmitted between transceiver 110 and mobile device 112. In one or more embodiments, the lookup table may be stored in mobile device 112 rather than in transceiver 110 such that mobile device 112 may independently determine its own location rather than or in addition to the location being determined by transceiver 110. In one or more alternative embodiments, multiple position determining calculations may be performed, for example, using transmission in a forward channel from transceiver 110 to mobile device 112, or in a reverse channel from mobile device 112 to transceiver 110, or combinations thereof. One or more of such multiple readings may be aggregated, averaged, or otherwise combined to decrease the percent error for location readings, although the scope of the claimed subject matter is not limited in this respect. In one or more embodiments, a map may be generated for different power levels of the transmitted signal. In such an arrangement, the lookup table may contain a set of values for each of the power level maps so that when a location of mobile device 112 is determined, the map that is used will be a map corresponding to the power level the signal transmitted between transceiver 110 and mobile device 112. Furthermore, such utilization of multiple power level maps may be based at least in part on a clustering algorithm wherein the data may be organized into one or more clusters of readings for a given power level, and the location determination may be made based on the cluster of data corresponding to a given power level. In addition, a set of data may be mapped to a corresponding room in the floor plan, for example, the kitchen, dining room, bedroom, and so on, such that the particular room in which the mobile device is located may be determined by looking up the room in the lookup table that corresponds to one or more characteristic values of the transmitted signal. In one or more embodiments, in the event that the data obtained at two or more locations is not unique, the power of the transmitted signal may be changed, a gain of the transmitted signal may be changed, or a receiver gain may be changed, or combinations thereof, to obtain additional values and/or plots at the locations in order to obtain values that are unique. These are, however, merely examples of how the location of mobile device 112 in the floor plan may be determined, and the scope of the claimed subject matter is not limited in this respect.

In one or more embodiments, the lookup table for the BER/RSSI graph of FIG. 5 may be organized into a database, which may comprise data for one or more homes or buildings. Such a database may refer to an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. These are, however, merely examples of database and/or operating system functions, and the scope of claimed subject matter is not limited in these respects.

Figure 6:
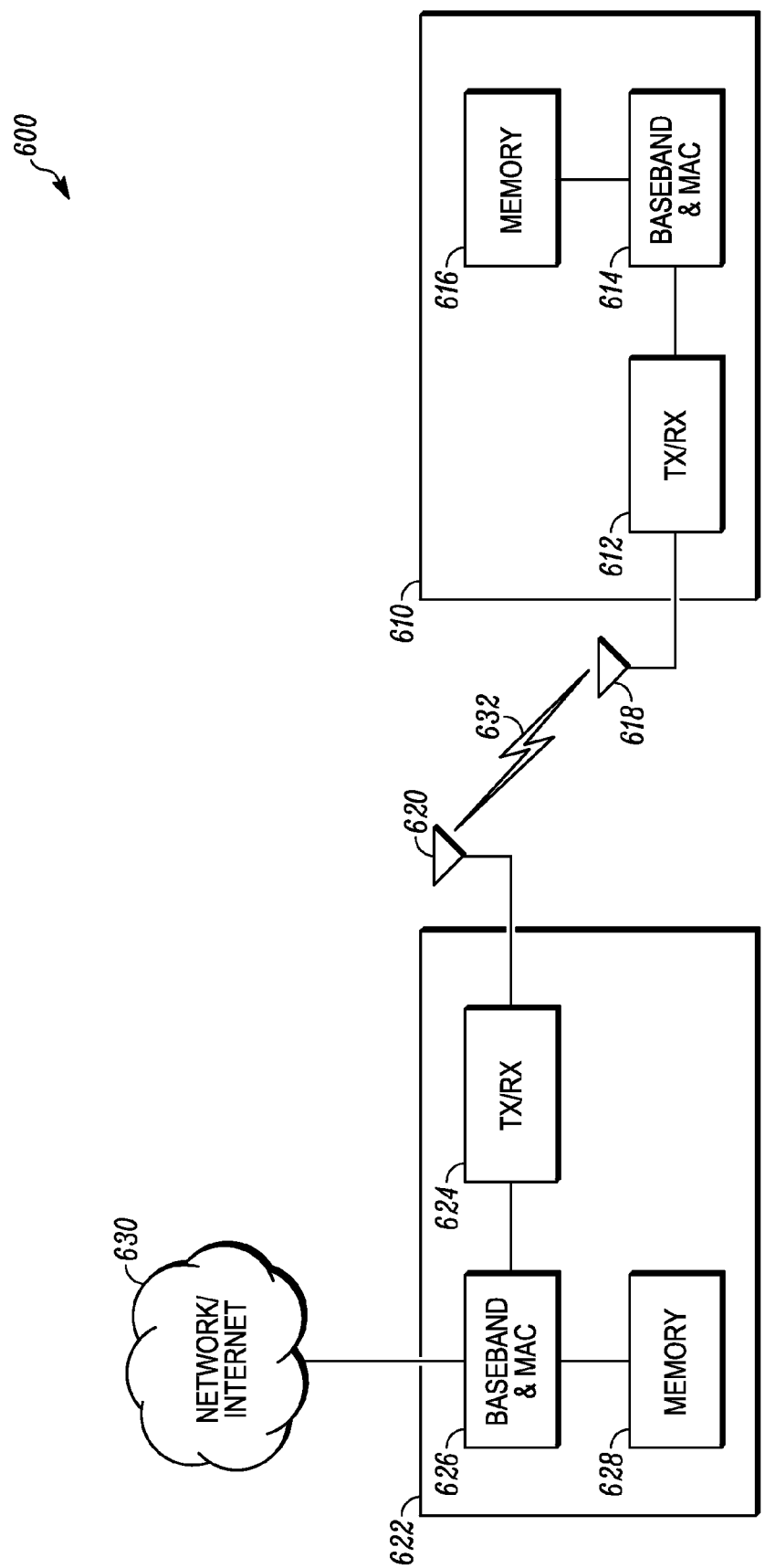
FIG. 6 is a block diagram of a wireless network communication system showing one or more network devices capable of capable of utilizing single point location tracking in accordance with one or more embodiments.

Referring now to FIG. 6, a block diagram of a wireless network communication system showing one or more network devices capable of capable of utilizing single point location tracking in accordance with one or more embodiments will be discussed. In the communication system 600 shown in FIG. 6, a mobile unit 610, which may correspond to mobile device 112, may include a wireless transceiver 612 to couple to an antenna 618 and to a processor 614 to provide baseband and media access control (MAC) processing functions. In one or more embodiments, mobile unit 610 may be a cellular telephone or an information handling system, such as a mobile personal computer or a personal digital assistant or the like, that incorporates a cellular telephone communication module, WLAN module, Bluetooth module, UWB module, and so on, although the scope of the claimed subject matter is not limited in this respect. Processor 614 in one embodiment may comprise a single processor, or alternatively may comprise a baseband processor and an applications processor, although the scope of the claimed subject matter is not limited in this respect. Processor 614 may couple to a memory 616 which may include volatile memory, such as dynamic random-access memory (DRAM), non-volatile memory, such as flash memory, or alternatively may include other types of storage, such as a hard disk drive, although the scope of the claimed subject matter is not limited in this respect. Some portion or all of memory 616 may be included on the same integrated circuit as processor 614, or alternatively some portion or all of memory 616 may be disposed on an integrated circuit or other medium, for example, a hard disk drive, that is external to the integrated circuit of processor 614, although the scope of the claimed subject matter is not limited in this respect.

Mobile unit 610 may communicate with access point 622, which may correspond to transceiver 110, via wireless communication link 632, in which access point 622 may include at least one antenna 620, transceiver 624, processor 626, and memory 628. In one embodiment, access point 622 may be a base station of a cellular telephone network, and in an alternative embodiment, access point 622 may be an access point or wireless router of a wireless local or personal area network, and/or may contain a WLAN module, Bluetooth module, UWB module, and so on, although the scope of the claimed subject matter is not limited in this respect. In an alternative embodiment, access point 622 and optionally mobile unit 610 may include two or more antennas, for example, to provide a spatial division multiple access (SDMA) system or a multiple input, multiple output (MIMO) system, although the scope of the claimed subject matter is not limited in this respect. Access point 622 may couple with network 630 so that mobile unit 610 may communicate with network 630, including devices coupled to network 630, by communicating with access point 622 via wireless communication link 632. Network 630 may include a public network, such as a telephone network or the Internet, or alternatively network 630 may include a private network, such as an intranet, or a combination of a public and a private network, although the scope of the claimed subject matter is not limited in this respect. Communication between mobile unit 610 and access point 622 may be implemented via a wireless local area network (WLAN), for example, a network compliant with a an Institute of Electrical and Electronics Engineers (IEEE) standard, such as IEEE 802.11a/b/g/n, HiperLAN-II, and so on, although the scope of the claimed subject matter is not limited in this respect. In another embodiment, communication between mobile unit 610 and access point 622 may be at least partially implemented via a cellular communication network compliant with a Third Generation Partnership Project (3GPP or 3G) standard, although the scope of the claimed subject matter is not limited in this respect. In one or more embodiments, antenna 618 may be utilized in a wireless sensor network or a mesh network, although the scope of the claimed subject matter is not limited in this respect. In one or more embodiments, communication system 600 may be disposed in a home or similar location to implement single point location tracking as discussed herein.

Figure 7:
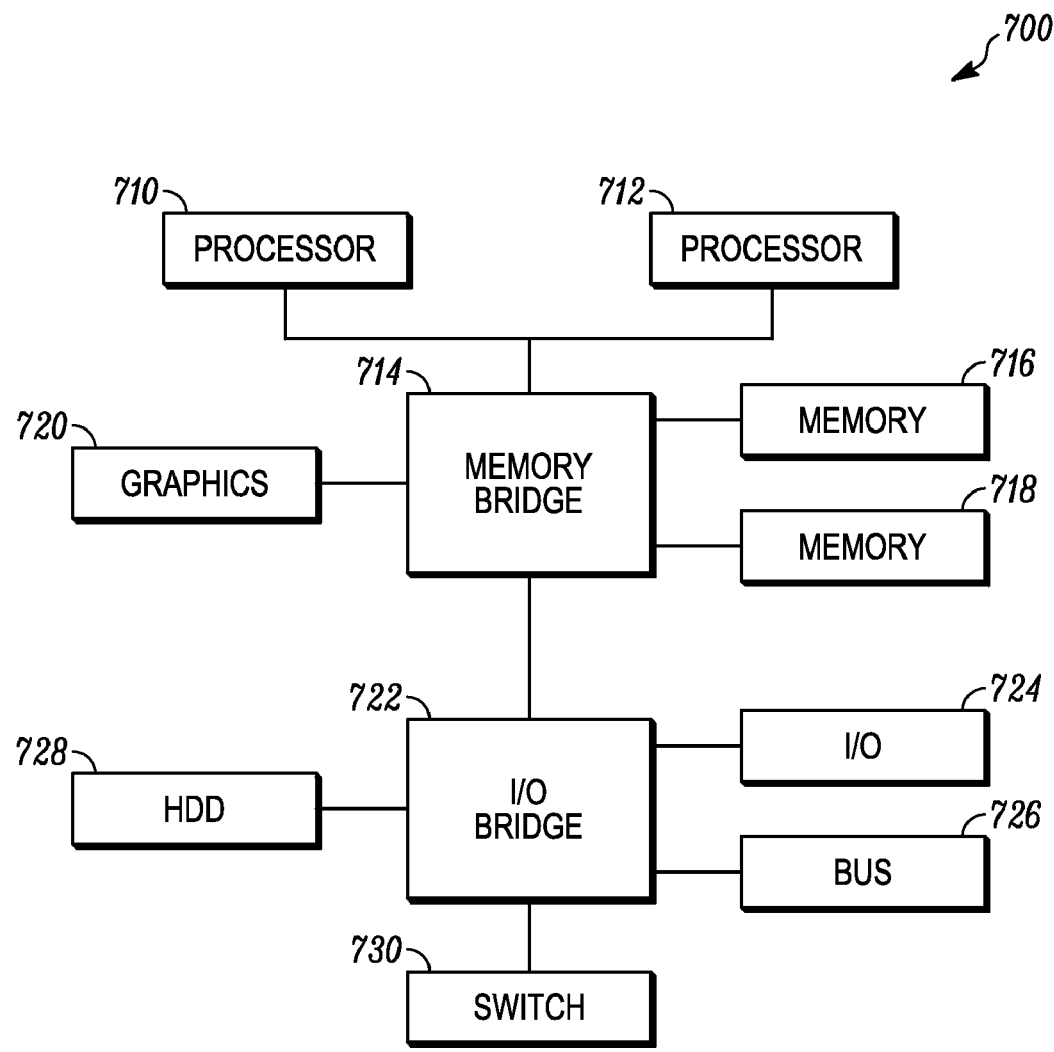
FIG. 7 is a block diagram of an information handling system capable of capable of utilizing single point location tracking in accordance with one or more embodiments.

Referring now to FIG. 7, a block diagram of an information handling system capable of capable of utilizing single point location tracking in accordance with one or more embodiments will be discussed. Information handling system 700 of FIG. 7 may tangibly embody one or more of any of the network elements as shown in and described with respect to FIG. 1. For example, information handling system 700 may represent the hardware of transceiver 110 and/or mobile device 112, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

Information handling system 700 may comprise one or more processors, such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example, volatile type memory and/or non-volatile type memory. Memory bridge 714 may couple to a graphics system 720 to drive a display device (not shown) coupled to information handling system 700.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems, such as a peripheral component interconnect (PCI) express type bus or the like, to connect one or more peripheral devices to information handling system 700. A hard disk drive (HDD) controller system 728 may couple one or more hard disk drives or the like to information handling system, for example, Serial ATA type drives or the like, or alternatively a semiconductor based drive comprising flash memory, phase change, and/or chalcogenide type memory or the like. Switch 730 may be utilized to couple one or more switched devices to I/O bridge 722, for example, Gigabit Ethernet type devices or the like. Furthermore, as shown in FIG. 7, information handling system 700 may include a radio-frequency (RF) block 732 comprising RF circuits and devices for wireless communication with other wireless communication devices and/or via wireless networks such as network 100 of FIG. 1, for example, in which information handling system 700 embodies base station and/or transceiver, although the scope of the claimed subject matter is not limited in this respect. In one or more embodiments, RF block 732 may comprise system 600 of FIG. 6, at least in part, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to single point location tracking and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    transmitting a signal from a transceiver to cover a floor plan of a building structure with radio-frequency energy from the transceiver;
    obtaining a first characteristic value of the transmitted signal and a second characteristic value of the transmitted signal at two or more coordinates within the floor plan;
    if the first obtained characteristic value and the second obtained characteristic value are not unique at two or more locations within the floor plan, changing a power of the transmitted signal, a gain of the transmitted signal, or a receiver gain, or combinations thereof, to obtain additional characteristic values or plots that result in unique values at the two or more locations; and
    storing the obtained first and second characteristic values of the transmitted signal for corresponding coordinate values in a lookup table.

2. A method as claimed in claim 1, wherein the first characteristic value comprises a bit error rate, a received signal strength indication, a transmit signal strength, or combinations thereof.

3. A method as claimed in claim 1, wherein the second characteristic value comprises a bit error rate, a received signal strength indication, a transmit signal strength, or combinations thereof.

4. A method as claimed in claim 1, wherein the lookup table comprises one or more sets of coordinates mapped to a corresponding room in the floor plan, said determining the location of the mobile device within the floor plan comprising determining a room in which the mobile device is located based at least in part on the room mapped to the coordinate value.

5. A method as claimed in claim 1, wherein the lookup table is stored in the transceiver.

6. A method as claimed in claim 1, wherein the lookup table is stored in the mobile device.

7. A method as claimed in claim 1, further comprising:
    transmitting a signal from a transceiver to a mobile device located within the floor plan;
    measuring the first characteristic value of the transmitted signal and the second characteristic value of the transmitted signal experienced by the mobile device at a location within the floor plan;
    determining the location of the mobile device within the floor plan by looking up a coordinate value in the lookup table corresponding to the first and second measured characteristic values of the transmitted signal.

8. An article of manufacture comprising: a non-transitory computer-readable medium having stored thereon instructions that, if executed by a computing communication device, result in at least the following:
transmitting a signal from a transceiver to cover a floor plan of a building structure with radio-frequency energy from the transceiver;
obtaining a first characteristic value of the transmitted signal and a second characteristic value of the transmitted signal at two or more coordinates within the floor plan;
if the first obtained characteristic value and the second obtained characteristic value are not unique at two or more locations within the floor plan, changing a power of the transmitted signal, a gain of the transmitted signal, or a receiver gain, or combinations thereof, to obtain additional characteristic values or plots that result in unique values at the two or more locations; and
storing the obtained first and second characteristic values of the transmitted signal for corresponding coordinate values in a lookup table.

9. An article of manufacture as claimed in claim 8, wherein the first characteristic value comprises a bit error rate, a received signal strength indication, a transmit signal strength, or combinations thereof.

10. An article of manufacture as claimed in claim 8, wherein the second characteristic value comprises a bit error rate, a received signal strength indication, a transmit signal strength, or combinations thereof.

11. An article of manufacture as claimed in claim 8, wherein the lookup table comprises one or more sets of coordinates mapped to a corresponding room in the floor plan, said determining the location of the mobile device within the floor plan comprising determining a room in which the mobile device is located based at least in part on the room mapped to the coordinate value.

12. An article of manufacture as claimed in claim 8, wherein the lookup table is to be stored in the transceiver.

13. An article of manufacture as claimed in claim 8, wherein the lookup table is to be stored in the mobile-device.

14. An article of manufacture as claimed in claim 8, further comprising:
transmitting a signal from a transceiver to a mobile device located within the floor plan;
measuring the first characteristic value of the transmitted signal and the second characteristic value of the transmitted signal experienced by the mobile device at a location within the floor plan;
determining the location of the mobile device within the floor plan by looking up a coordinate value in the lookup table corresponding to the first and second measured characteristic values of the transmitted signal.

15. An apparatus, comprising:
a baseband processor;
a memory coupled to said baseband processor; and
a radio-frequency transceiver coupled to said baseband processor;
wherein the baseband processor is capable of:
transmitting a signal from a transceiver to cover a floor plan of a building structure with radio-frequency energy from the transceiver;
obtaining a first characteristic value of the transmitted signal and a second characteristic value of the transmitted signal at two or more coordinates within the floor plan;
if the first obtained characteristic value and the second obtained characteristic value are not unique at two or more locations within the floor plan, changing a power of the transmitted signal, a gain of the transmitted signal, or a receiver gain, or combinations thereof, to obtain additional characteristic values or plots that result in unique values at the two or more locations; and
storing the obtained first and second characteristic values of the transmitted signal for corresponding coordinate values in a lookup table.

16. An apparatus as claimed in claim 15, wherein the first characteristic value comprises a bit error rate, a receiver signal strength indication, a transmitter signal strength, or combinations thereof.

17. An apparatus as claimed in claim 15, wherein the second characteristic value comprises a bit error rate, a receiver signal strength indication, a transmitter signal strength, or combinations thereof.

18. An apparatus as claimed in claim 15, wherein the lookup table comprises one or more sets of coordinates mapped to a corresponding room in the floor plan, said baseband processor being capable of determining a room in which the mobile device is located based at least in part on the room mapped to the coordinate value.

19. An apparatus as claimed in claim 15, wherein the lookup table is stored in said memory.

20. An apparatus as claimed in claim 15, wherein the baseband processor is further capable of:
transmitting a signal from a transceiver to a mobile device located within the floor plan;
measuring the first characteristic value of the transmitted signal and the second characteristic value of the transmitted signal experienced by the mobile device at a location within the floor plan; and
determining the location of the mobile device within the floor plan by looking up a coordinate value in the lookup table corresponding to the first and second measured characteristic values of the transmitted signal.

* * * * *